3,757,004
GELATIN COACERVATE FIBERS

Arthur G. Brown, Menlo Park, Richard W. Gibson, San Jose, and Gloria F. Sirine, Mountain View, Calif., assignors to Stanford Research Institute, Menlo Park, Calif.

No Drawing. Continuation-in-part of application Ser. No. 26,798, Apr. 8, 1970. This application Nov. 19, 1971, Ser. No. 200,521

Int. Cl. C08h 1/06

U.S. Cl. 260—117   4 Claims

ABSTRACT OF THE DISCLOSURE

The technique of coacervation is employed to produce an aqueous suspension of liquid, fiber-shaped gelatin particles which can be solidified and recovered in dried fiber form. The gelatin fibers so produced exhibit a certain amount of crystallinity and are flexible, strong and stretchable. They can be used to form various non-woven textile materials, or they can be spun into yarn and then woven into fabrics. The aqueous suspension of coacervated gelatin fiber-shaped particles, wherein the latter are present in liquid form as a separate phase or wherein the particles have become gelled, can be used as a vehicle in which to admix the said gelatin particles with other gelatin fibers or with those of natural leather, cotton, cellulose or other natural or synthetic materials, this admixing step then being followed by one of recovering a product wherein the gelatin and other fibers are evenly distributed.

RELATED APPLICATION

This application is a continuation-in-part of our copending application, Ser. No. 26,798, filed Apr. 8, 1970, now abandoned.

BACKGROUND OF THE INVENTION

The manufacture of synthetic fibers has traditionally involved extruding a polymer solution through spinnerettes into a coagulating bath or into air where the solvent is removed or the polymer is reacted to give an insoluble filament. These filaments may then be cut into the desired length for subsequent use. In contrast to such methods, that of the present invention permits of the direct production of staple and other fibers of varying dimensions using an aqueous solution of gelatin as a starting material.

SUMMARY OF THE INVENTION

The present invention provides a new class of fibers made up of a gelatin coacervate. These fibers are formed in situ as an aqueous solution of gelatin is subjected to appropriate coacervation conditions to form a suspension of liquid, fiber-shaped gelatin particles which can then be obtained in solid form by cooling the system and separating off the resulting gelled fibers. The coacervated fibers recovered from the aqueous system differ from normal gelatin particles of a similar shape in that the former possess crystallinity and good tensile strength, among other useful properties.

The technique of coacervation involves the separation of a lyophylic system into two liquid phases. This method has heretofore been employed to convert an aqueous solution of gelatin into one wherein the gelatin is present as a separate phase in the form of small, round liquid droplets which are rich in water. This phase separation can be induced by first providing an aqueous solution wherein the gelatin present has a positive charge and wherein there is present another polymer (e.g., carrageenin, gum arabic or other polymer) having a negative charge, and by then modifying the concentration, pH and/or the temperature of the solution so as to induce formation of the aforesaid coacervate droplets. Such methods are described in a reference work by H. G. B. De Jong, "Coacervation-Les Coacervats et Leur Importance en Biologie," Hermann and Cie, Paris, 1937.

It has now been found that by conducting the coacervation of the gelatin solution in accordance with the general methods heretofore known, but with appropriate modifications in certain of the conditions of pH, temperature and/or concentration, the liquid gelatin coacervate phase can be made to take the form of a mass of discrete, elongated, fiber-shaped liquid particles rather than as a mass of round droplets. These fiber-shaped liquid particles, which are in a general state of suspension in the liquid system, have a diameter of from about 20 to 1000 microns and a length of at least about ⅛ inch. Much longer particle lengths ranging from ½ to 5 or more inches are not uncommon. As these liquid particles are caused to become set in solid form and dried, the diameter decreases somewhat due to loss of water, but the length of the fiber remains much the same. These fiber-shaped liquid particles which are formed to diameter ratio of at least 3:1, with much higher ratios such as several hundred:1 being not uncommon.

Speaking generally, in preparing gelatin coacervates by the positive polymer-negative polymer process of the prior art, there is prepared an aqueous solution of a negative colloid or polymer which is suitable for admixture with a positive gelatin polymer to form a potential coacervate system, i.e., a system which upon altering a property such as pH, temperature or concentration will form a coacervate. By "positive" or "negative" polymer is meant a polymer which, under the conditions of coacervation, carries a net positive or negative charge. Many such polymers are amphoteric and contain both acidic and basic groups; such materials can be either positive or negative depending on the prevailing pH conditions. The selected negative polymer is preferably one which has a high charge density. Materials of this character include polyethylene-maleic anhydride copolymer, in hydrolysed form, which has an acid equivalent of about 12 milliequivalent per gram; polyvinylmethyl ether-maleic anhydride copolymer having an acid equivalent of about 8 milliequivalents per gram; and carrageenin with an acid eq. of about 3 to 4 milliequivalents per gram. However, negative polymers having a much lower acid equivalent and therefore a lower charge density, may be used. For example, gum arabic which has an acid equivalent of about 0.07 milliequivalent per gram, can be used either alone or along with other negative polymers.

As the positive polymer there can be used gelatins of either low or high bloom strength and of either the acidic (A) type or basic (B) type. With either type of gelatin, the reaction should be carried out under a pH which is lower than the isoelectric point of the particular gelatin employed.

In practicing the formation of a fibrous gelatin coacervate by the positive polymer-negative polymer method, there is employed an aqueous reaction mixture which contains not more than about 5 percent by weight gelatin.

As regards pH, fibers have been obtained at pHs of from about 5.0 to 7.8 when using carrageenin as the negative polymer, and at pHs ranging from about 5.25 to 7.7 when using a combination of gum arabic and polyethylene-maleic anhydride copolymers as the negative polymer constituent. There is some indication that higher pHs within a given range appear to provide fibers of longer length.

The temperature to be employed in forming the fibrous coacervate may vary somewhat with the particular method employed. Thus, when gelatin is formed into fibers by the gradual addition of carregeenin to a gelatin at a solution pH of 6.2, fibers form at temperatures as high as about 43.8° C. However, when the gelatin solution, at a pH of 6.2, is maintained at about 50° C. throughout addition of carrageenin solution, fiber formation does not occur until the solution has been cooled to about 39.5° C. It has also been found that there is an interrelationship between temperature and pH as regards the fiber-forming function inasmuch as higher pH conditions are associated with lower fiber-forming temperature thresholds. Thus, as noted above, one run at a pH of 6.2 and an initial temperature of 50° C. started forming fibers at 39.5° C., while another run at pH 6.5 and initial temperature of 48.8° C. formed fibers at 35° C., and one at a pH of 6.72 and an initial temperature 50.8° C. did not form fibers until the temperature had dropped at 34.5° C. These data were obtained with a gelatin-carrageenin system. In the system in which a combination of gum arabic and a polyethylene-maleic anhydride copolymer is used as the negative colloid, gelatin fiber formation does not normally occurr above about 36° C. under any conditions.

Coacervate gelatin fibers can also be produced by the salting out method in which an aqueous gelatin solution is admixed with an aqueous solution of a salt such, for example, as sodium sulfate. This method is set forth below in Example 6.

In practicing the present invention, it is to be noted that the gelatin coacervate which separates out in the form of a fiber-like or stringy particulate phase is liquid in character. This liquid fiber phase, which is important to the obtaining of satisfactory fiber properties, is an intermediate one which is followed by other steps wherein the fiber entities are solidified and preferably stabilized as well. Alternatively, the liquid fiber-containing system can be admixed with other fibers either before or after these liquid fiber particles are solidified and recovered in solid fiber form. In any event, cooling the system to below the gel point of the gelatin will solidify the liquid fibers, though at this point the fiber entities still contain a great deal of water of gelation. Dry fibers can be obtained merely by evaporating off this water. Inasmuch as the dried fibers can be dissolved in hot water, they preferably are stabilized by treatment with aldehydes, with chromium or other polyvalent metal salts, with vegetable tannins or synthetic tanning agents, or with other reactive cross-linking agents such as those employed in conventional leather tanning operations. In a representative cross-linking method, the aqueous suspension of coacervated liquid gelatin fibers is first chilled to 10° C. in order to solidify and harden the contained fiber masses. The cross-linking agent, e.g., aqueous glutaraldehyde, is then added to the cold bath which is then allowed to come to room temperatures. The resulting fibers, while capable of taking up water, do not dissolve therein and are well adapted to be used in any one of the processes by which other fibers of a similar size and strength can be employed.

In forming the fibers of the present invention, the aqueous gelatin solution, in which fiber coacervation is induced either by addition of a negatively charged colloid or by use of a suitable salt, is conventionally subjected to stirring in order that the ingredients may be properly mixed and maintained under uniform conditions of temperatures and pH as the coacervation reaction continues. However, such stirring is not necessary to the production of the fibers. In general, the use of a stirring propeller turning at slow speeds has the effect of providing fibers of relatively long length, while speeding up the propeller will tend to provide fibers of increasingly shorter lengths.

Coacervated gelatin fibers produced by the positive polymer-negative polymer technique, in the as-formed condition, contain both the gelatin as well as the negatively-charged, phase-inducing polymer. In other words, most of the gelatin contained in the aqueous solution separates out as a separate coacervate phase which is intimately admixed with most of the carrageenin or other negatively charged polymer employed. The negatively charged polymer component of the fibers can either be left therein or it can readily be washed out of the fibers after the same have been subjected to drying and cross-linking treatments. However, for most applications the fibers can usefully be employed even though they also contain the negatively charged polymer component.

It has also been found that useful coacervated gelatin fibers can be prepared containing substantial amounts of natural or synthetic rubber or latexes. Thus, as shown in detail in Example 7 below, white fibers of a soft and flexible character can be formed which contain roughly equal proportions of a vulcanized natural rubber latex and gelatin, together with any negative polymer which is not removed. In this process it has been found essentail to add the rubber (usually in latex form) along with the solution of the negatively charged polymer component, this solution or dispersion then preferably being slowly added to the aqueous gelatin sol.

As set forth above, the liquid gelatin fibers which are produced in situ in the aqueous solution have a diameter of approximately 20 to 1000 microns and a length of at least ⅛ inch and ranging up to several inches. The dried fibers produced from these liquid fiber particles have much the same length, but a smaller diameter due to loss of water. The dried fibers are somewhat crystalline, and X-ray examination shows that they are uniquely characterized by sharp bands at 2.82–2.84 A and 4.15 A. They also display the diffuse band at 4.45 A which is displayed by non-coacervated gelatin particles.

The following specific examples illustrate various methods of carrying out the present invention to produce the novel filamentary compositions thereof.

EXAMPLE 1

Forty grams of pigskin gelatin (Swift's Superclear) having an isoelectric point at pH 8–9 and a bloom strength of 275 g. are dissolved in 320 ml. of deionized water at 55° C. This solution is then added to 240 ml. of deionized water, at 50° C., along with 80 ml. of an 83% solution of sorbitol in water (Atlas Chemical Company's Arlex). The sorbitol is employed to adjust the density of the solution and expedite fiber formation of relatively low stirring rates. The pH of this solution is then adjusted to a level of 6.37 by addition of 20% sodium hydroxide. To this solution is slowly added, over the course of 1 to 2 hours, a solution of 3.84 g. of carrageenin in 640 ml. of deionized water at 50° C. and with a pH adjusted to 6.37. The carrageenin employed is Marine Colloid's Gelcarin GS-500. The reaction mixture is slowly stirred (100 r.p.m.) with a paddle type stirring propeller as the carrageenin solution is added and during the ensuing period in which the solution is allowed to cool to room temperatures. Formation of the liquid fibers begins to occur as the temperature reaches about 36–37° C. and continues as the solution cools still further. It is readily observed that the coacervate is made up of fibers having a length ranging from ⅛ to ⅜ inch and a diameter of approximately 100 microns. The suspension of liquid fibers is now cooled to 10° C. and held at this temperature for one hour. To the cold suspension of gelled fibers is then added, with stirring, a quantity of 40 ml. of a 25% aqueous glutaraldehyde solution to induce cross-linking of the gelatin molecules in each fiber, after which the mixture is allowed to come to room temperatures. The solid fibers are then filtered off, washed with deionized water and air dried to give a mass of discrete fibers. These fibers, on being stressed to the break point, appear to stretch before breaking. They have a tensile strength of about $1.8 \times 10^6$ g./cm.$^2$, or 25,700 pounds per square inch.

Another batch of fibers is then prepared in the same fashion as described in the preceding paragraph, but without the practice of the glutaraldehyde cross-linking step. After the aqueous suspension of this batch of gelled fibers has cooled to room temperature, it is thoroughly mixed with the mass of dried, cross-linked fibers prepared as recited in the previous paragraph. The mixture is then filtered to recover a mass of admixed discrete fibers which is then placed between two screens and allowed to air dry. There is recovered a relatively stiff sheet representing an adherent mass of non-woven fibers. To increase the flexibility of the sheet it can be fatliquored by immersion in a solution consisting of one part of arquad 2C and three parts Ethomeen T/12 (both surface active agents of Armour & Company), together with 48 parts mineral oil and 48 parts neat's-foot oil, which mixture has been diluted 5:1 with water. After 3 hours in this solution the sheet is removed and allowed to air dry. It is found to be highly flexible and to have a leather-like quality.

EXAMPLE 2

Three solutions are prepared as follows:

(1) Dissolve 40 g. of high isoelectric point, high bloom strength gelatin (Swift's Superclear) in 320 ml. of deionized water at 50° C.

(2) Dissolve 40 g. of gum arabic in 320 ml. of deionized water of 50° C. and filter.

(3) Dissolve 2 g. of polyethylene-maleic anhydride copolymer (Monsanto's EMA) in 100 ml. of deionized water and adjust the pH to 9.0 with 20% sodium hydroxide solution in order to convert the copolymer to its sodium salt.

(4) Add the above solutions to 2400 ml. of deionized water at 45–40° C. Adjust the pH to 6.3 and, while stirring the solution at a moderate rate, allow the same to cool to room temperature. Formation of liquid, fiber-shaped gelatin particles is observed to occur slightly below 36° C. The product is then chilled, cross-linked and dried as in Example 1 to provide fibers ranging in length from approximately ⅛ to ½ inch. The physical characteristics of these fibers are essentially the same as those described above in Example 1.

EXAMPLE 3

Example 2 is repeated, but with 4 g. of Sterling R carbon black (Cabot Corporation) being dispersed in the solution of polyethylene-maleic anhydride copolymer salt. The fibers obtained in this operation are a deep black and manifest a high sheen.

EXAMPLE 4

The operation of Example 2 is again repeated, but using a gelatin of relatively low bloom strength (Swift's Stabilo gelatin, bloom strength 125 g.), and adjusting the pH of the final solution mixture to 5.80. The fibers perpared in this fashion are, in general, somewhat finer and shorter than those obtained from the Superclear gelatin of higher bloom strength.

EXAMPLE 5

Dissolve 20 g. of a low isoelectric point, high strength "B" gelatin (Swift's 230 "B") in 160 ml. of deionized water at 50° C. and dilute with one liter of water at this same temperature. Adjust the pH to 5.0. To this solution add slowly, with stirring, 320 ml. of a 0.6% aqueous solution of carrageenin (Marine Colloid's Gelcarin GS–500) at 50° C. and pH 5.0. Liquid, fiber-shaped gelatin particles are formed in the system as the solution is cooled, with moderate stirring. Said particles become gelled as the resulting suspension of the fiber-shaped particles in the residual liquid solution reaches room temperatures. The fibers are now complete and are relatively thicker than those produced in the process of Example 1, though of comparable length. However, the length of these fibers exceeds the diameter thereof by a factor of at least 3:1. The fibers are then chilled, cross-linked and dried, as recited in Example 1. The carrageenin content of the fibers can then be substantially eliminated by washing in water, which may or may not contain a surface active agent such as Armac HT.

EXAMPLE 6

Dissolve 20 g. of a type "B" gelatin having a bloom strength of 500 g. (Armour's 5A Hide Ground Glue) in 480 ml. of deionized water at 55° C., and to this solution slowly add 500 ml. of a 25% aqueous solution of sodium sulfate, also at 55° C. Adjust the solution to pH 8 with a 20% solution of sodium hydroxide and then pour the entire batch into 240 ml. of a 2% aqueous solution of sodium sulfate maintained at 7° C., with stirring. Liquid, fiber-shaped gelatin particles having a diameter between about 20 and 1000 microns and a length up to 6 inches are obtained at a relatively slow mixing rate, with the fibers being reduced in length to approximately ½ to 1 inch at an increased stirring rate. These fiber-shaped particles become gelled and set up to solid form as the temperature of the system falls and eventually reaches 7° C. There is then added 10 ml. of a 25% aqueous solution of glutaraldehyde, following which the solution is allowed to warm to room temperatures with stirring. The fibers are then filtered off and thoroughly washed with water to remove the contained salt, followed by air drying to yield the dry fibers.

EXAMPLE 7

Thirty grams of a prevulcanized natural rubber latex are dispersed in 100 ml. of a 1% solution of polyethylene-maleic anhydride copolymer (Monsanto EMA) adjusted to pH 9. This solution is then added slowly, with stirring, to a beaker containing 1200 ml. of deionized water, 180 g. of a 11% gelatin sol (Swift's Superclear) at 40° C. and pH 9.0. The pH of this resulting mixture is then lowered slowly to 6.4 by addition of 14% acetic acid, thereby inducing the formation of fiber-shaped particles wherein the gelatin component is in the liquid state, said particles having a diameter of between about 20 and 1000 microns and a length of at least ⅛ inch. The suspension of these fibers is then allowed to cool to room temperature with stirring thereby causing gelation within the fiber-shaped particles. White fibers, with a diameter between 20 and 1000 microns and a length of at least ⅛ inch, consisting of coacervated gelatin and rubber (along with the negative copolymer), are formed in this fashion, and they are then separated off and dried. The resulting mass of fibers, as collected on a fine screen, provides sheet products which are soft, flexible and strong.

The fibers of the present invention can readily be dyed by conventional vegetable or other dyestuffs after the fibers have been stabilized by the cross-linking treatment.

We claim:

1. An aqueous suspension of liquid, fiber-shaped gelatin particles having a length of at least ⅛ inch, a diameter of from about 20 to 1,000 microns, and a length to diameter ratio of at least 3:1, said particles having been formed in situ in an aqueous gelatin solution by coacervation.

2. A composition as recited in claim 1 wherein said fiber-shaped particles are present in a gelled form induced by cooling the suspension of claim 1 below the gel point of the suspended liquid gelatin particles.

3. A composition as recited in claim 2 wherein said fiber-shaped particles are present in a gelled, cross-linked, water-insoluble form induced by treating the gelled particles of claim 2 with a cross-linking agent.

4. A composition as recited in claim 3 wherein the mass of fiber-shaped particles is recovered in substantially water-free form.

References Cited

UNITED STATES PATENTS

| | | | |
|---|---|---|---|
| 2,800,457 | 7/1957 | Green et al. | 252—316 |
| 2,800,458 | 7/1957 | Green | 252—316 |
| 3,176,001 | 3/1965 | Veis et al. | 260—118 |

OTHER REFERENCES

Encyclopedia of Polymer Science and Technology, vol. 8, 969, pp. 727–728.

HOWARD E. SCHAIN, Primary Examiner

U.S. Cl. X.R.

106—135; 260—4 R, 8, 118